(12) United States Patent
Pickholz et al.

(10) Patent No.: US 11,913,616 B2
(45) Date of Patent: Feb. 27, 2024

(54) SINGLE POINT ALIGNMENT FOR LED PRESCRIPTION OPTICS

(71) Applicant: MagWerks Vision Inc., Oxford, MI (US)

(72) Inventors: Michael F. Pickholz, Oxford, MI (US); Steven Francis Tregilgas, Oxford, MI (US)

(73) Assignee: MagWerks Vision Inc., Oxford, MI (US)

( * ) Notice: Subject to any disclaimer, the term of this patent is extended or adjusted under 35 U.S.C. 154(b) by 36 days.

(21) Appl. No.: 17/894,668

(22) Filed: Aug. 24, 2022

(65) Prior Publication Data

US 2023/0063164 A1    Mar. 2, 2023

Related U.S. Application Data

(60) Provisional application No. 63/236,342, filed on Aug. 24, 2021.

(51) Int. Cl.
| | | |
|---|---|---|
| F21S 41/19 | (2018.01) | |
| F21S 41/143 | (2018.01) | |
| F21S 41/255 | (2018.01) | |
| F21Y 115/10 | (2016.01) | |

(52) U.S. Cl.
CPC ........... *F21S 41/192* (2018.01); *F21S 41/143* (2018.01); *F21S 41/255* (2018.01); *F21Y 2115/10* (2016.08)

(58) Field of Classification Search
CPC ........ F21S 41/143; F21S 41/322; F21V 14/06
See application file for complete search history.

(56) References Cited

U.S. PATENT DOCUMENTS

| | | | | |
|---|---|---|---|---|
| 4,930,367 A | * | 6/1990 | Nagasawa | B60Q 1/0683 74/423 |
| 5,813,743 A | * | 9/1998 | Naka | F21V 17/02 362/329 |
| 5,926,320 A | * | 7/1999 | Parkyn, Jr. | F21S 41/322 359/641 |
| 2014/0085919 A1 | * | 3/2014 | Tsai | F21S 41/143 362/522 |
| 2015/0184819 A1 | * | 7/2015 | Maliar | F21S 41/26 362/512 |
| 2015/0323148 A1 | * | 11/2015 | Tsuda | B60Q 1/0683 362/512 |
| 2017/0370548 A1 | * | 12/2017 | Dinant | F21S 41/295 |
| 2018/0156423 A1 | * | 6/2018 | Murby | F21S 8/026 |
| 2019/0017692 A1 | * | 1/2019 | Dinant | B60Q 1/0483 |
| 2019/0092218 A1 | * | 3/2019 | Kouchi | F21S 41/635 |

* cited by examiner

*Primary Examiner* — Eric T Eide
(74) *Attorney, Agent, or Firm* — Young Basile Hanlon & MacFarlane, P.C.

(57) ABSTRACT

A vehicle lamp includes a substrate, a lens having a pivotal attachment to the substrate and defining a lamp chamber between the lens and the substrate, at least one light source provided in the lamp chamber, an alignment portion integral with and extending from the lens parallel to the substrate and having an aperture, and an adjustment mechanism extending through the aperture and the substrate, the adjustment mechanism configured to adjust alignment of the lens with a single-point adjustment.

17 Claims, 20 Drawing Sheets

SINGLE POINT ALIGNMENT FOR LED PRESCRIPTION OPTICS

CROSS-REFERENCE TO RELATED APPLICATION(S)

This application claims priority to and the benefit of U.S. Provisional Patent Application Ser. No. 63/236,342, filed Aug. 24, 2021, the entire disclosure of which is hereby incorporated by reference.

TECHNICAL FIELD

This disclosure relates to the field of prescription optics used in lamps utilized for illumination or signalization in applications such as vehicle headlamps, tail lamps, signal lamps, etc. The prescription optics can be unitary structures made from optical silicone to be used with LEDs, or can be plastic, glass or other transparent material lenses that have a silicone or other elastomeric or flexible component attached, such as a skirt, through which the single point alignment takes place.

BACKGROUND

Optical lenses engineered to harness and direct light emitted from light sources are produced with basic techniques devised to tailor light output. Since the 1980's, plastic lenses have steadily replaced glass as the transparent outer enclosure for lighting applications in most fields. Historically, plastic lenses have been produced from rigid materials, such as, but not limited to, polycarbonate (PC), poly(methyl) methacrylate (PMMA), polystyrene (PS), cyclic olefin polymer (COP), cyclic olefin copolymer (COCP).

These materials are essentially rigid in nature, not substantially deforming under applied pressure or through the force of gravity. Once properly fixed and in place, such materials essentially retain their geometric configuration. However, there are many disadvantages to the use of plastic for optical lenses, particularly in the automotive field, given the propensity to deform or distort under heat, low abrasion resistance, making them prone to scratching, propensity to damage via UV (Ultraviolet) radiation, such as discoloration, amongst them. Furthermore, separate components (e.g., when utilizing reflector-type optical) can lead to additional disadvantages and low levels of efficiency. There is an ever-growing need for weather-proof, light-weight lamps for electric and autonomous vehicles that can meet the different prescription requirements of the various applications while also meeting government mandated specifications.

Another disadvantage of conventional plastic optical lenses is the requirement of an adjuster mechanism to align, effectively aim, the lamp(s) in order to compensate for variations on the vehicle attitude vis-à-vis the road. A conventional lamp is mounted on a vehicle, for example, using four bosses, with three external adjusters placed in appropriate positions on the lamp. These adjusters require mounting space, add weight to the lamp, and take time to properly align. They also require that each lamp be a distinct, separate unit as the alignment is tied to the lamp housing.

SUMMARY

Disclosed herein are embodiments of unitary optically clear prescription optics or lenses. One example of a unitary prescription optic as disclosed herein has a molded body comprising: a front surface configured as a light exit; an integral TIR (Total Internal Reflection) reflector configured to receive and reflect light from a LED light source; and an integral attachment portion configured to mount the molded body within a housing.

Also disclosed herein are lamps, such as for vehicles. One example of a lamp has a unitary molded optic or lens comprising: a front surface configured as a light exit; an integral reflector molded to meet a prescription light output; and an integral attachment portion. The lamp also includes an LED light source, the integral reflector receiving and reflecting light from the LED light source, and a housing configured to mount the unitary molded body within a structure, the integral attachment portion attached directly to the housing without an additional seal member.

Another example of a lamp with a single-stage optic has a unitary molded body molded from silicone comprising: a front surface configured as a light exit; an integral reflector molded to meet a prescription light output; and an integral attachment portion. The lamp further has a light source and a housing configured to mount the unitary molded body to a structure.

The unitary silicone prescription optics disclosed herein provide a single lens optic with integrally molded reflector, the optic molded from silicone and capable of complex prescriptions that meet the regulatory requirements for regulated lighting applications. The unitary silicone prescription optics provide a much lighter lamp beneficial to all vehicles, and particularly autonomous vehicles and electric vehicles. Because the optic is a single component, the optics can reach 85%+efficiency, a significant increase over conventional lamps, which lose about 10% to 15% in light output for each optical component through which light passes, such a typical external lamp cover lens. The optic can attain greater than 85% efficiency and more depending on the prescription. The unitary silicone prescription optics are particularly useful in LED applications as optical silicone has a significantly higher temperature resistance than conventional plastic lenses, thereby enabling the placing of the optic in very close proximity, even in contact with the LED(s) without distortion or deformation issues. Furthermore, optical silicone being effectively impervious to UV (Ultraviolet) radiation, the close proximity of the optical silicone lens to the LED light source does not carry the potential of material degradation, such as yellowing, which can negatively affect plastic materials. The disclosed prescription optics can be used without any coatings or outer lenses, as the silicone is effectively impervious to UV damage and damage from road debris impingement, although silicone coatings, which further enhance performance durability are also available. The prescription optics disclosed herein can be mounted directly into the vehicle lamp housing, without the need for additional sealant or gaskets, as the silicone can also be configured as an effective seal. Because the optic is one piece, there is no alignment necessary between components when installed in the application.

Also disclosed is a single-point adjustment mechanism for use with lamps having a single silicone optic or lens. As a nonlimiting example, a prescription lamp includes a unitary molded body (optic or lends) molded from silicone. The unitary molded body has a front surface configured as a light exit, an integral molded reflector cooperating with the front surface to meet a prescription light output, an integral attachment portion and a reinforcing structure molded with the unitary molded body, the reinforcing structure imparting structural strength to the attachment portion. An LED light source is included, the integral reflector receiving and reflecting light from the LED light source. A heat sink may carry the LED light source in order to address LED cooling requirements. A pivot mechanism extends from the heat sink and has opposing pivots, wherein the reinforcing structure is hingedly attached to the opposing pivots. An adjustment mechanism extends at a single point through the reinforcing structure at a position where the reinforcing structure is covered with silicone. Alternatively the adjustment mechanism is accessible from the rear of the lamp structure.

Also disclosed is a single-point adjustment mechanism for use with lamps having conventional plastic, glass or other suitable material lenses or optics with at least a portion over-molded (i.e. lens co-molded with a distinct material) with silicone, rubber, elastomeric or other compliant, flexible materials, or the unitary molded silicone prescription optics disclosed herein.

A vehicle lamp is disclosed that includes a substrate, a lens or optic having a pivotal attachment to the substrate and defining a lamp chamber between the lens and the substrate, at least one light source provided in the lamp chamber, an alignment portion integral with and extending from the lens parallel to the substrate and having an aperture, and an adjustment mechanism extending through the aperture and the substrate, the adjustment mechanism configured to adjust alignment of the lens with a single-point adjustment.

A prescription lamp is also disclosed comprising a unitary molded lens of optical silicone, comprising: a front surface configured as a light exit; an integral reflector configured with the front surface to meet a prescription light output; an integral attachment portion; and a reinforcing structure molded with the unitary molded lens, the reinforcing structure imparting structural strength to at least the attachment portion. An LED light source is included, the unitary molded lens receiving and reflecting light from the LED light source. A substrate carries the LED light source and a pivot mechanism extends from the substrate, the reinforcing structure hingedly attached to the pivot mechanism. An adjustment mechanism extends at a single point through the reinforcing structure and the substrate.

Also disclosed herein is a vehicle headlamp and component assembly comprising a lens, a lamp housing cooperating with the lens to at least partially define a lamp chamber that is generally fluidly isolated from an ambient atmosphere outside the lamp chamber, at least one light source provided in the lamp chamber, at least one vehicle component connected to the lamp housing outside the lamp chamber, the lamp housing configured to bear structural loads applied by the at least one vehicle component, and a single-point adjustment mechanism positioned through an adjustment portion of the lens.

These and other embodiments and aspects are contemplated herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
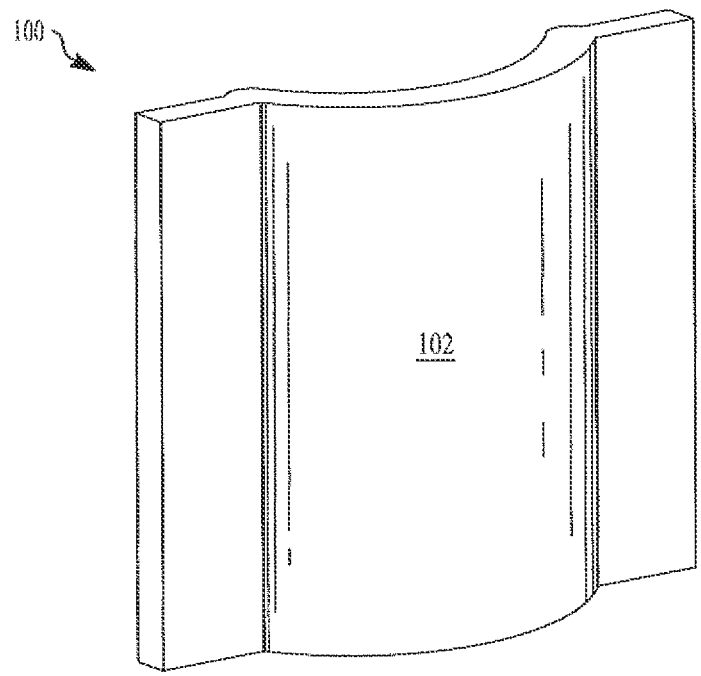
FIG. 1A is a front perspective view of a unitary silicone prescription optic as disclosed herein.

Conventional automotive lamps incorporate a light source, which may include a circuit board, a primary optic system, which can comprise a reflector and a separate lens, for example, along with a secondary optic, the components held in a housing, which includes an outer lens in order to achieve a generally fluidly isolated system. Additional lenses may also be included in the primary optic, such as a collimating lens, in certain applications, such as fog lamps. Reflectors are typically made of various plastics, via plastic injection molding, metal castings or stamped metal construction. Outer lenses of the secondary optic were typically glass, but have evolved to plastics, such as PC, PMMA, PS, COP and COCP, as examples. Where glass is both weather and UV resistant, plastics are generally not. Thus, plastic outer lenses typically require a UV coating to protect against deterioration from sunlight, as well as a hard coating to protect against damage from impinging road debris. To further protect the lamp from weather, gaskets and/or sealants are necessary to properly seal the lamp at least between the outer lens and the housing.

These conventional lamps require the multi-stage optics to properly collect, then shape the light into the desired illumination pattern. As light passes through multiple components, efficiency is lost. On average, about 10% to 15% efficiency as it reflected or passes through each successive medium. Current conventional automotive lamp efficiency for reflector-type optical systems hovers around 40% or less, which entails a major proportion of the LEDs light output is thus lost.

Disclosed herein are embodiments of a single-stage optic used with a light source and a housing to provide a lamp that is lightweight, has fewer components, is water-tight and UV resistant, among other benefits. The unitary silicone prescription optics disclosed herein have a molded silicone body comprising: a front surface configured as a light exit; an integral reflector configured to receive and reflect light from an LED light source; and integral attachment portions configured to mount within a housing. As used herein "prescription" refers to an optic or a lens that is designed to meet certain specification with regard to light or radiation pattern and intensity.

The unitary silicone prescription optics disclosed herein will be understood by those skilled in the art to have utility in numerous, various applications, including those applications having regulated specifications and those that do not. Applications having regulated specifications, for which the disclosed optics are particularly suited, include, without limitation, electric and motor vehicles (including automobiles, trucks, aircraft, watercraft, recreational vehicles, off-road vehicles, and the like), aerospace, and other lighting. Vehicle applications include, but are not limited to, headlamps, turn signal lamps, low beam lamps, high beam lamps, signal lamps, side lighting lamps, auxiliary lamps, tail lamps and fog lamps. The term "exterior vehicle lamp" used herein generally refers to those listed as well as others known and used in the industry.

Optical silicone provides many advantages over the rigid plastic typically used in lenses. Common headlamp plastic lenses, such as those produced from PC (polycarbonate) require the additional application of external anti-UV coatings in order to preclude the degradation of the plastic, which otherwise rapidly turns opaque, greatly reducing the functional performance as well as adversely impacting the appearance of the product. Such products commonly have a limited performance lifespan, leading to often severe optical degradation with extended sunlight (UV) exposure, a clear negative for products frequently or continually exposed to sun. Optical silicone is impervious to UV radiation damage. Optical silicone testing has demonstrated resistance to UV damage in excess of 10 years in direct sun exposure. No anti-UV coating is needed with optical silicone.

Conventional plastic lenses, particularly those used on vehicle headlamps, also require hard coatings in order to mitigate the rapid surface degradation brought about by foreign object impingement, occurring, for example, during travel. Optical silicone has an inherent resistance to gravel and other road debris impingement. The soft, rubber-like properties of optical silicone are such that, rather than imbedding and/or damaging the surface of the plastic lenses, the energy is absorbed within the optical silicone without adversely affecting the optical clarity of the material, with the debris simply bouncing-off without imparting physical damage to the optic silicone material.

Plastics used to make lenses shrink while cooling, which leads to the loss of critical optical shape definition as the material pulls away from the desired tool optical geometry. This can be particularly pronounced in large molds, with large optical lens volumes leading to undesirable deformations in other critical optic areas. The industry has sought to address such issues via multi-step molding solutions, whereby lenses are produced via successive molding "steps" thereby accumulating material in subsequent molding operations so as to control shrink and thereby deliver accurate as-molded optical performance. Such processes are inherently expensive, given the multi-step nature of the molding equipment.

Optical silicone can be molded/formed accurately in a large format optic with minimal sink or other optical aberrations and in a single step molding process. Optical silicone optics are formed via a chemical reaction process, which commonly utilizes base resin mixed with a catalyst on a typical 50/50 ration. Heat is added to the process in order to expedite the chemical reaction and accelerate the curing process. Given the minimal, highly controllable material shrink rate vs. the significantly greater degree associated with thermoplastics, a far greater accuracy in the replication of the optical surface is achieved, all in a single molding step. Such properties are critically important in achieving sharp, knife-edged optical elements, which otherwise become less accurate, more rounded and less defined when utilizing plastics, thereby introducing unwanted optical inaccuracies. Optical silicone is rubber-like in nature. The flexibility of optical silicone provides the ability to incorporate flexible elements, the ability to incorporate significant "undercuts", which otherwise would prevent plastics to be removed from the mold without incorporating mold action, and the ability to significantly deform yet return to its as-molded shape. A significant trait of silicone is its high degree of elasticity and "memory", thereby enabling a high degree of distortion yet, allowing a return to its original, as molded geometry, once the external applied forces are removed. This is stark contrast to the rigid nature of plastics as well as glass optical elements.

In the case of glass, while knife-edge features are manufacturable, these nevertheless are by nature extremely brittle, prone to damage whether from handling, impact or vibration. Any such damage immediately introducing highly negative optical impacts making the use of glass materials impractical for sharp-edge configurations. Conversely, optical silicone materials can achieve very sharp, highly-defined optical surfaces, which are effectively impervious to handling, vibration and even light impact. Light impact being, once again, readily absorbed, with the intrinsic material memory insuring the return to the original geometry, thereby preserving the optical function under adverse, even extreme functional duties.

Yet another advantage of using optical silicone is its significantly higher temperature resistance than other common optical-grade plastics, which make optical silicone particularly useful in LED applications where close proximity between the optical element and the LED source is functionally advantageous. Such close proximity between LEDs and conventional plastic lenses is often precluded due to the thermal degradation brought about by high temperatures on plastic optics, for instance. Conventional clear plastics are only temperature resistant up to around 100° C. For example, PC begins to experience deformation by 120° C. and PMMA is temperature resistant only up to about 90° C. Silicones are usually rated to remain thermally stable to temperatures in the area of 200° C., which is nearly double that of traditional optical grade plastics. High-power LEDs, such as those developed for automotive headlamp applications usually exhibit an exterior surface temperature of approximately 135° C., well above the softening temperature of optical PC materials. As such care must be taken to position plastic optical components sufficiently distant from the LED light sources so as to preclude deformation, even melting. Silicone optics can thus be placed near or directly over high temperature LED sources, thereby significantly improving optical performance while precluding damage over time, a critical functional advantage.

Another optical silicone advantage relates to the aforementioned tendency of PC to deteriorate under the presence of UV radiation, which most LEDs emit, even to a low extent. Over time such UV radiations can thus negatively affect the color and transmission capabilities of PC, as well as other optically clear plastic materials, thereby introducing yet additional design issues, which negatively affect optical performance, both on a short as well as long-term basis. optical silicone allows UV radiation to pass-through, thereby not affecting the molecular composition and/or properties of the material over time.

The ability to combine the outer lens, some or all of any additional optical elements, and the reflector into a unitary body, providing full optical management, also provides many advantages. The silicone optics do not need additional lenses for protection or further light refraction and can be directly exposed to atmosphere.

Figure 1B:
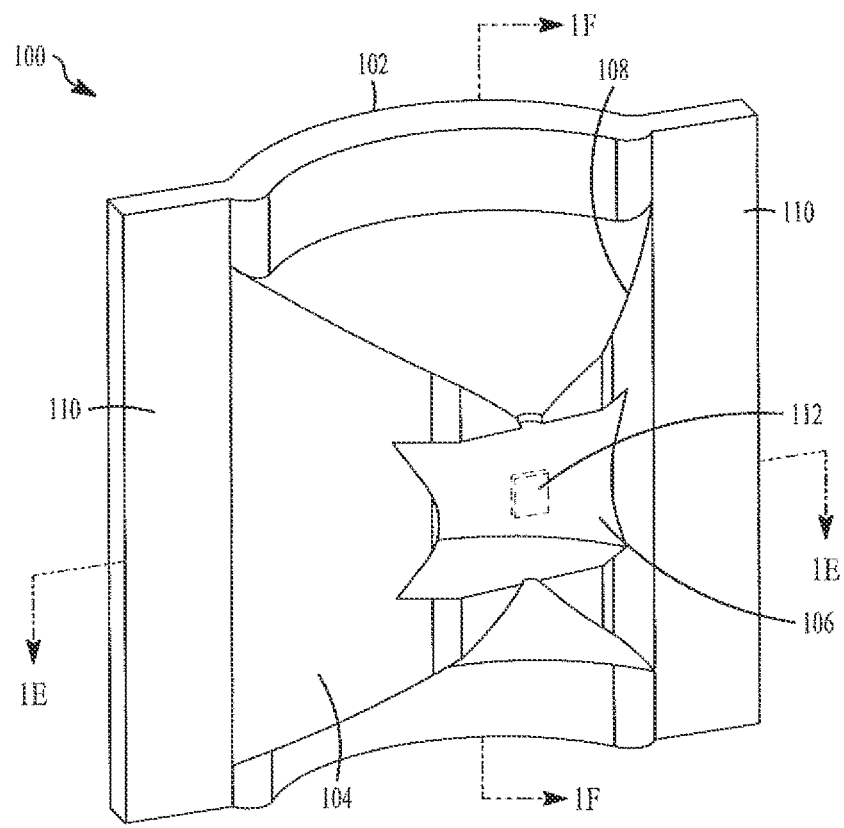
FIG. 1B is a rear perspective view of the unitary silicone prescription optic in FIG. 1A.
Figure 1C:
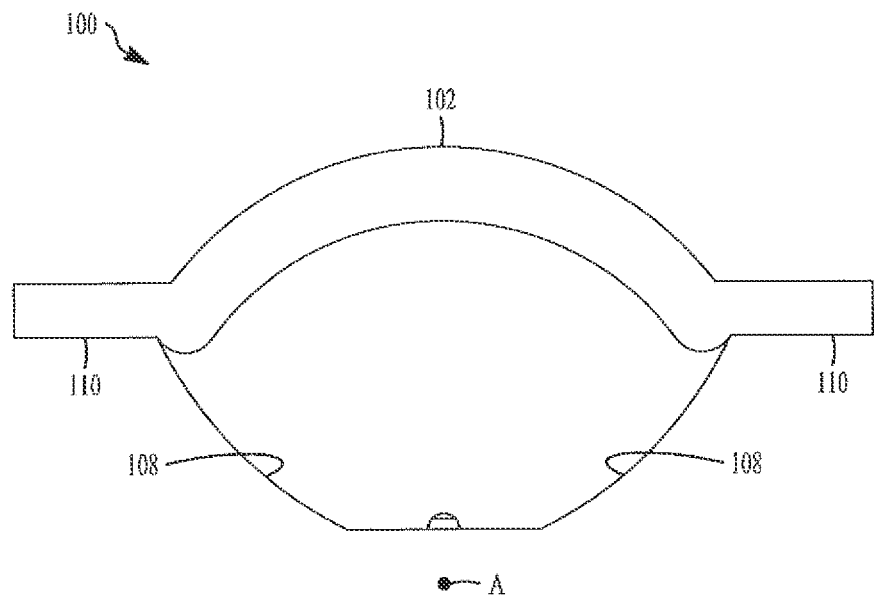
FIG. 1C is a top plan view of the unitary silicone prescription optic in FIG. 1A.
Figure 2:
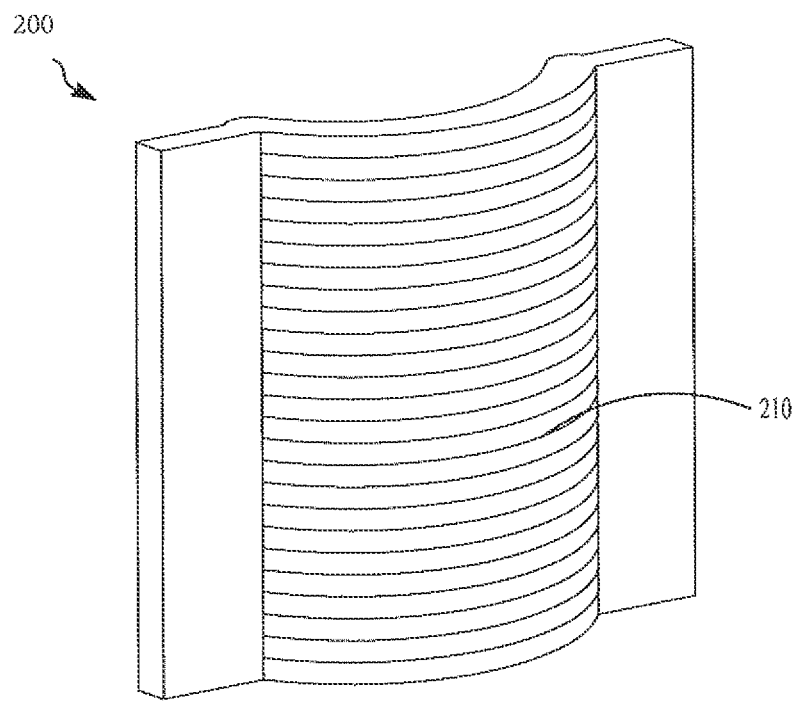
FIG. 2 is a front perspective view of another aspect of a unitary silicone prescription optic as disclosed herein.

FIG. 1A is a front perspective view of an embodiment of a single-stage optic or lens for a lamp, or a unitary silicone prescription optic 100, and FIG. 1B is a rear perspective view of FIG. 1A. The front surface 102 is an exit surface through which light exits the optic. The front surface 102 can be smooth, can have vertical or horizontal flutes, such as the horizontal flutes 210 illustrated with the unitary silicone prescription optic of FIG. 2. The front surface 102 may have pillows, or other contours that are necessary to provide the requisite light dispersion pattern and/or intensity. The flutes, pillows or other optical features are molded into the front surface 102 as the prescription optic 100 is molded. The front surface 102 is designed to meet the prescription and specifications for which it will be used. The front surface 102 is generally coating-free in use else the applications of coatings, which further enhance the already high functionality of Optical Silicone via the further enhancement of chemical resistance, surface toughness and the like. No coating for UV protection or damage protection is generally required as the silicone material is UV resistant and generally resistant to damage from impinging debris.

Figure 1D:
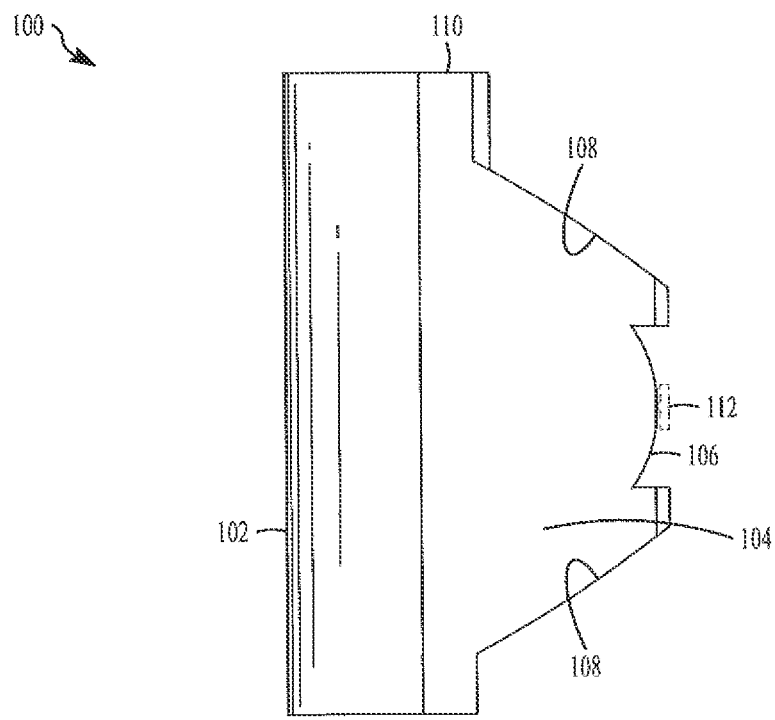
FIG. 1D is a right-side view of the unitary silicone prescription optic in FIG. 1A.
Figure 1E:
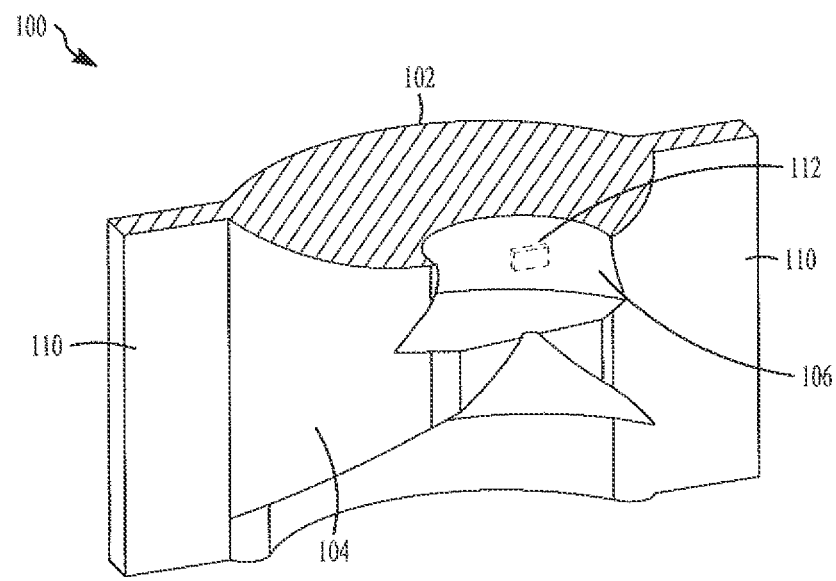
FIG. 1E is a rear perspective view of a cross-sectional view of the unitary silicone prescription optic in FIG. 1A along line E.
Figure 1F:
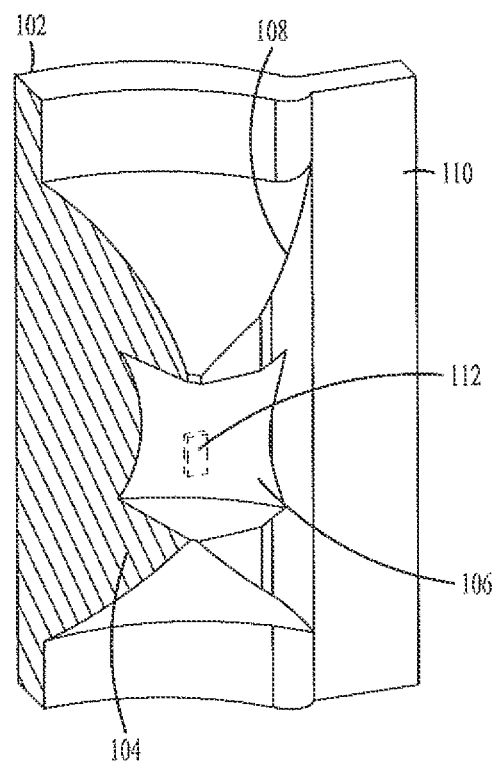
FIG. 1F is a rear perspective view of a cross-sectional view of the unitary silicone prescription optic in FIG. 1A along line F.
Figure 1G:
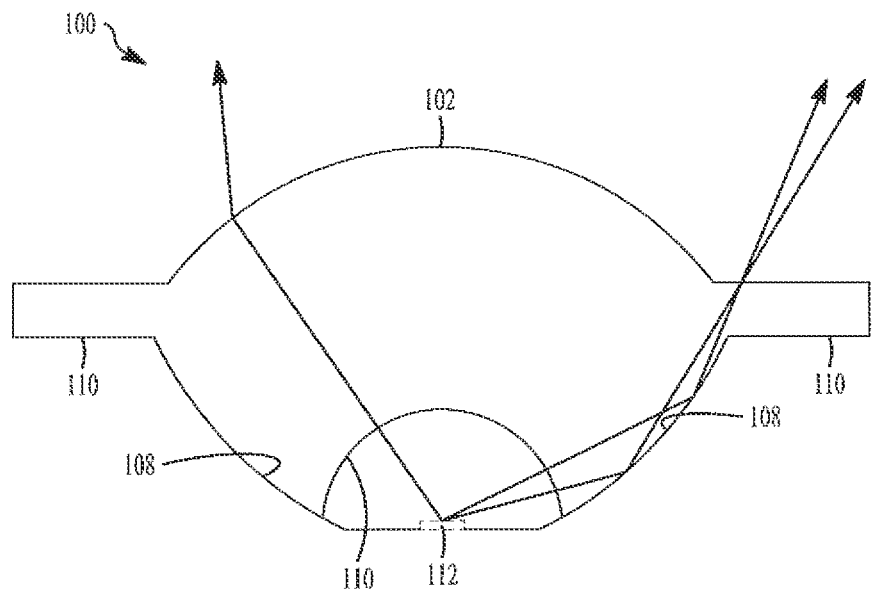
FIG. 1G is a top plan view of the unitary silicone prescription optic in FIG. 1E.
Figure 1H:
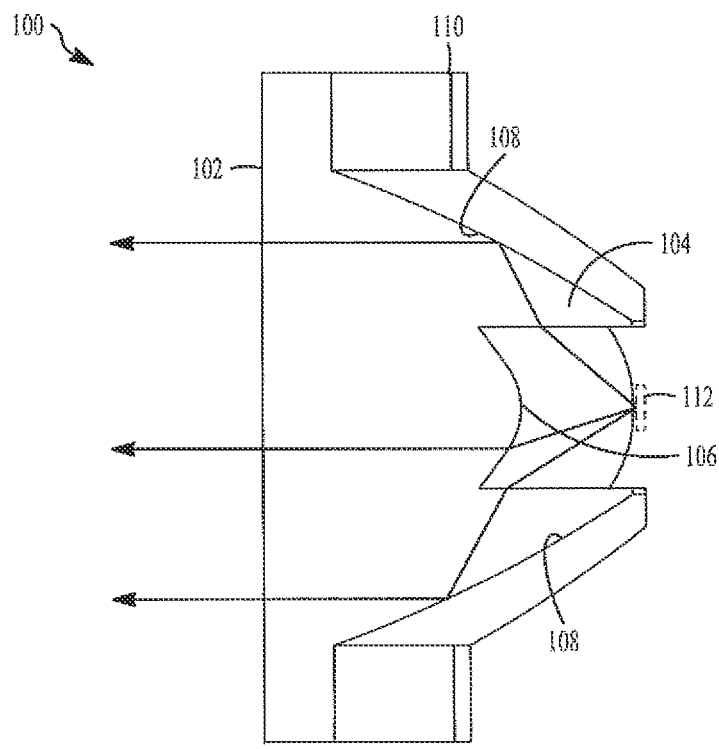
FIG. 1H is a right-side view of the unitary silicone prescription optic in FIG. 1F.

As seen in FIG. 1B, the reflector 104 is integrally molded with the front surface 102. The reflector 104 is configured to receive and reflect light from an LED light source 112, shown in broken line. The reflector 104 will have one or more light receiving surfaces 106 which are surfaces formed around vertical and horizontal axis. The reflector 104 also has multiple reflecting surfaces 108. FIG. 1D is a side view of the unitary silicone prescription optic 100. FIG. 1E is a perspective view of a cross-section of FIG. 1B along line E, and FIG. 1F is a perspective view of another cross-section of FIG. 1B along line F. FIG. 1G is a top plan view of FIG. 1E, and FIG. 1H is a right-side view of FIG. 1F when viewing from the front. Together FIGS. 1G and 1H illustrate the multiple light reflecting surfaces 108. The multiple light reflecting surfaces 108, providing total internal reflection (TIR) faces, gather the light, making above 85% efficiency possible. The reflector 104, working in collaboration with the light exit surface, front surface 102, is shaped depending on the prescription, application and specifications. The reflector illustrated herein is provided as an example and is not meant to be limiting.

The unitary silicone prescription optic 100 also has integral attachment portions 110 that will hold the unitary silicone prescription optic 100 in a housing or supporting element. Due to the rubber-like, flexible nature of the optical silicone, the unitary silicone prescription optic 100 may be its own sealing gasket to sealing contact the housing. Conventional rigid plastic requires the use of a gasket and/or sealant between the lens and the housing to seal the interior against moisture, for example, from rain, snow and humidity, which can create moisture accumulation in the interior of the lamp or otherwise form condensation on the interior of the lens. Such a gasket or other additional sealing member is not needed as the contact between the housing and the suitably configured unitary silicone prescription optic 100 is such that it seals against weather without the need for a gasket or other additional sealing member. To affect the water-tight contact between the silicone optic and the housing, a simple mechanical retention to create uniform, tight contact, can be used.

The rubber-like flexibility of optical silicone renders thin lenses, or thin areas of lenses, prone to deformation due to external forces such as gravity, external mechanical pressure, aerodynamic pressure, vibrations, etc. Although the integral combination of the lens and the reflector in the disclosed unitary prescription optics will generally result in a structure with that is sufficiently thick, and therefore not impacted by the rubber-like flexibility with regard to deformation, some portions of the disclosed unitary prescription optics may be thin enough to be impacted. Accordingly, internal mechanical reinforcement in the thin portions may be desirable.

Figure 3:
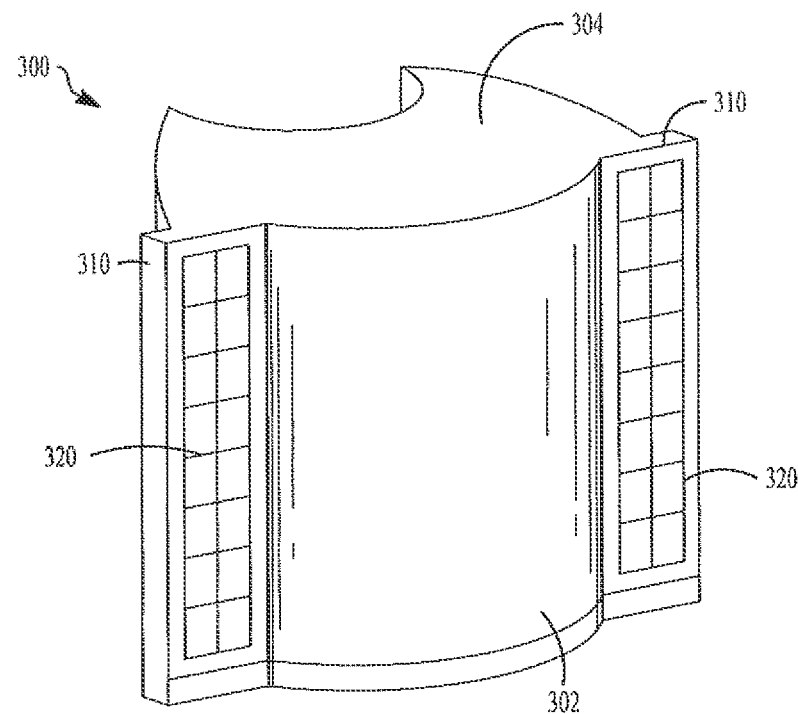
FIG. 3 is a front perspective view of yet another aspect of a unitary silicone prescription optic as disclosed herein with a heating and/or reinforcing embedded within the outer portion of the lens unit.

FIG. 3 illustrates another aspect of a unitary silicone prescription optic 300. As illustrated, the unitary optic 300 is thicker where the lens, or front surface 302, and the reflector 304 are molded and are thinner at the attachment portions 310. To provide structural mechanical strength to the attachment portions 310, a reinforcing structure 320, such as a reinforcing grid, is molded within the silicone material of the attachment portions 310. The unitary prescription optic 300 is internally reinforced at the attachment portions 310 by the suitable mechanically strong reinforcing structure 320, as well as the thickness of the remainder of the optic. The reinforcing structures 320 can be of any design that provides sufficient structural support to the optic and may be selected based on aesthetics or other reasons. The reinforcing structure 320 may be constructed from a variety of known materials, such as, but not limited to, thin wires, molded plastics, cast or molded metals, metal stampings and the like. The reinforcing structure 320 is not limited to the attachment portions 310. The lens itself may be sufficiently thin in nature to experience mechanical deformation under common use conditions, brough about by vibration, mechanical pressure, aerodynamic loads or even the force of gravity given the high degree of flexibility associated with optical silicone's rubber-like properties. A mechanical internal reinforcement may be insert molded within the thickness of the lens in order mechanically stabilize the lens. This reinforcement devise can also perform the function of a heating mechanism via the suitable configuration of these reinforcements to provide a heating function via, for instance, the application of electric current to all or portions of the reinforcing grid. The reinforcing structures can be designed so as not to interfere with the light pattern created be the lens and/or reflector.

Figure 4A:
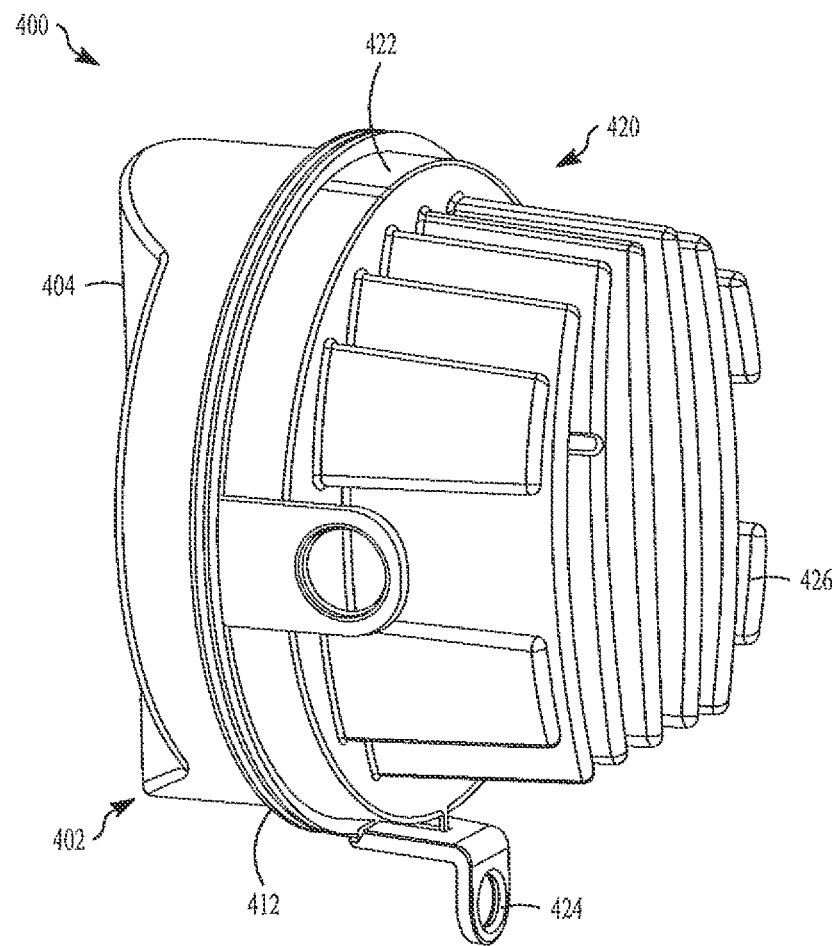
FIG. 4A is a perspective view of a lamp with a single-stage optic as disclosed herein.
Figure 4B:
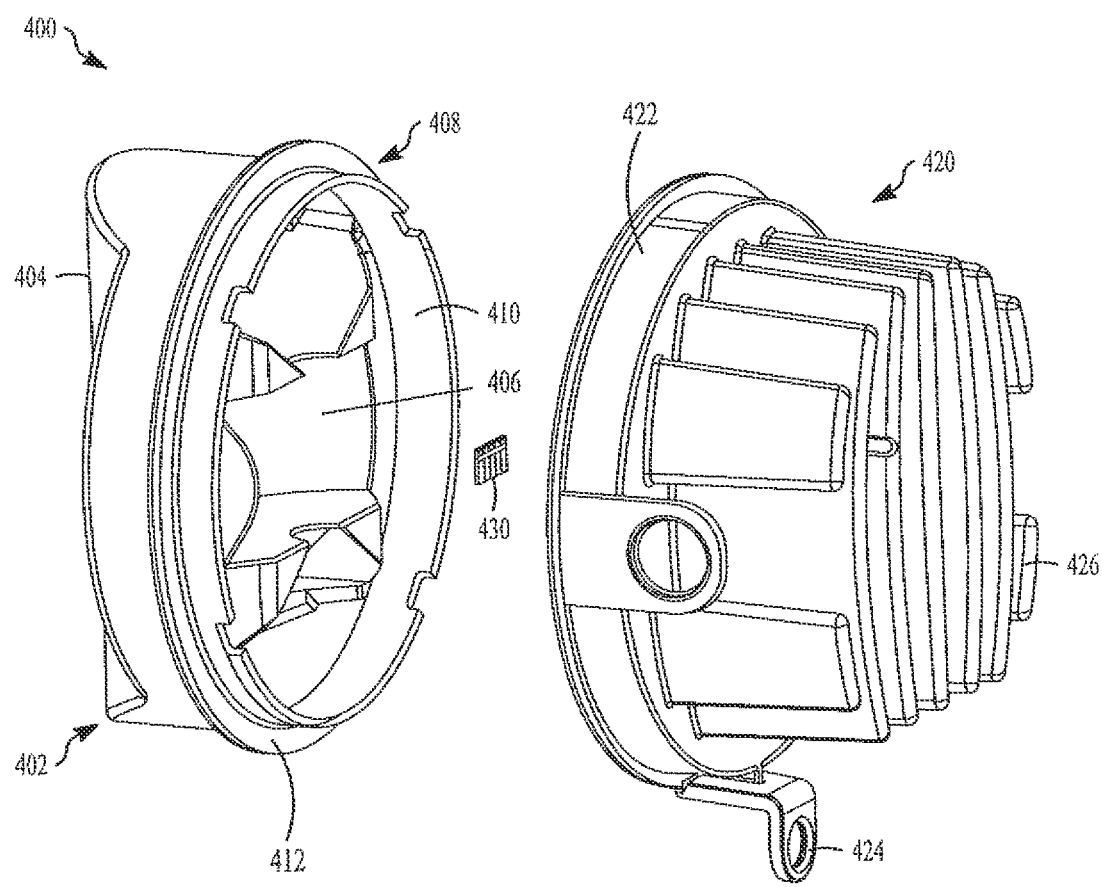
FIG. 4B is an exploded view of the lamp of FIG. 4A.

Also disclosed herein are lamps having a single-stage optic, such as for vehicle applications. One example of a lamp for a vehicle with a single-stage optic is illustrated in FIGS. 4A and 4B, with FIG. 4B being an exploded view of FIG. 4A. The lamp 400 has a unitary molded body 402 molded from silicone. The unitary molded body 402 has a round cross-section and is different from those depicted in the other drawings as a means of providing an example of a different shape and prescription. It is to be noted that the unitary molded body can have any cross-sectional shape as required by the design of the lamp such that it engages the housing. The unitary front surface and reflector can be of differing designs depending on the prescription. In FIG. 4, the unitary molded body has a front surface 404 configured as a light exit, an integral reflector 406 molded to, which in cooperation with the front surface 404 meets a prescription light output, and an integral attachment portion 408. As shown, the attachment portion 408 has a first attachment member 410 and a second attachment member 412. The attachment portion 408 can be of any configuration that provides the requisite attachment to the housing, creating a water-tight seal without the need for an additional sealing member such as a gasket, although this does not preclude the use of adhesives or any other fastening means if so desired. The attachment portion 408 in FIG. 4 includes the first attachment member 410 to fit within a housing 420 and the second attachment member 412, contacting the housing in a flange-like capacity. Either or both of the first attachment member 410 or the second attachment member 412 can include a reinforcing structure as previously described.

The lamp 400 also includes an LED light source 430, the integral reflector receiving and reflecting light from the LED light source 430. The LED light source is not limited and can be one or more LEDs and can include a circuit board and/or other means of powering and controlling the LED(s). A housing 420 is configured to sealingly engage the unitary molded body 402 as well as mount the unitary molded body 402 within a vehicle exterior, the integral attachment portion 408 attached directly to the housing 420 without an additional seal member. The housing 420 includes a single stage lens attachment 422 configured to attached to the unitary molded body 402, attachment members 424 to attach the lamp 400 to a vehicle or other lighting application, and, optionally, a heat sink 426. The hit sink 426 may also or alternatively be provided at the LED light source.

The unitary silicone prescription optics disclosed herein provide a single-stage optic with integrally molded reflector, the optic molded from silicone and capable of complex prescriptions that meet the regulatory requirements for regulated lighting applications either singly or in cooperation with one or more additional light units suitably configured to provide the overall desired optical beam pattern results. The unitary silicone prescription optics provide a much lighter lamp beneficial to all vehicles, and particularly autonomous vehicles and electric vehicles. Because the optic is a single component, the optics can exceed 85% efficiency, a significant increase over conventional lamps, which lose about 10% to 15% efficiency for each optical component through which light passes or is reflected therein. The unitary silicone prescription optics can be used with high power LEDs as the silicone has a higher temperature resistance than conventional plastic lenses. The disclosed prescription optics are used without any coatings or outer lenses, as the silicone is effectively impervious to US damage and most damage from road debris impingement although additional coatings may be utilized in order to achieve even higher robustness and chemical resistance requirements. The prescription optics disclosed herein can be mounted directly into the vehicle lamp housing, without the need for an additional member such as a gasket, as the silicone acts as a seal, protecting the optic from weather related issues liquid, dust or other debris ingress. An adhesive or mechanical retention may be used to obtain a uniform, tight fit between the housing and the optic. Because the optic is one piece, there is no alignment necessary between components when installed in the application.

The use of the silicone enables single-point adjustment of the prescription optic. The single-point adjustment mechanism can be used with the prescription optics disclosed herein, as well as conventional plastic or glass lenses, so long as the conventional plastic lenses have a portion of the lens covered or over-molded in a compliant material such as rubber or silicon, that portion being the portion through which the adjustment mechanism extends.

Figure 5A:
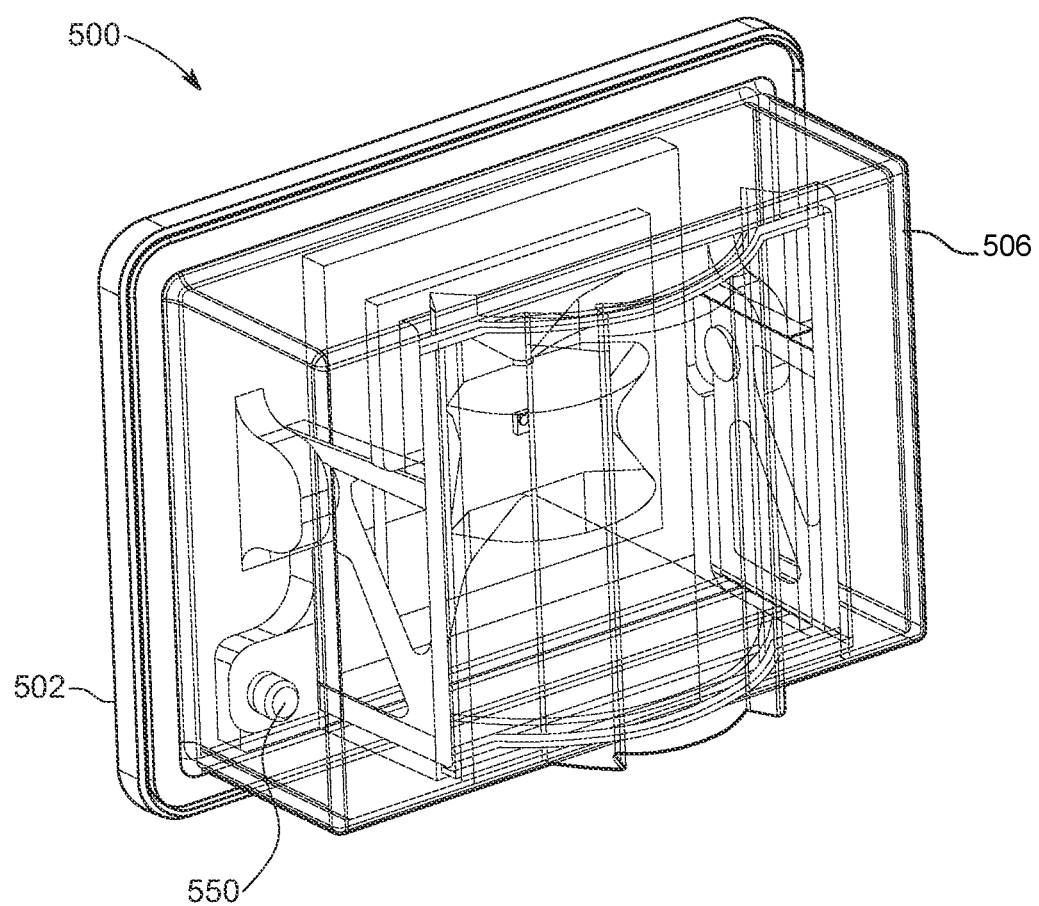
FIG. 5A is a front perspective view of a prescription lamp with single point adjustment as disclosed herein with a transparent skirt.
Figure 5B:
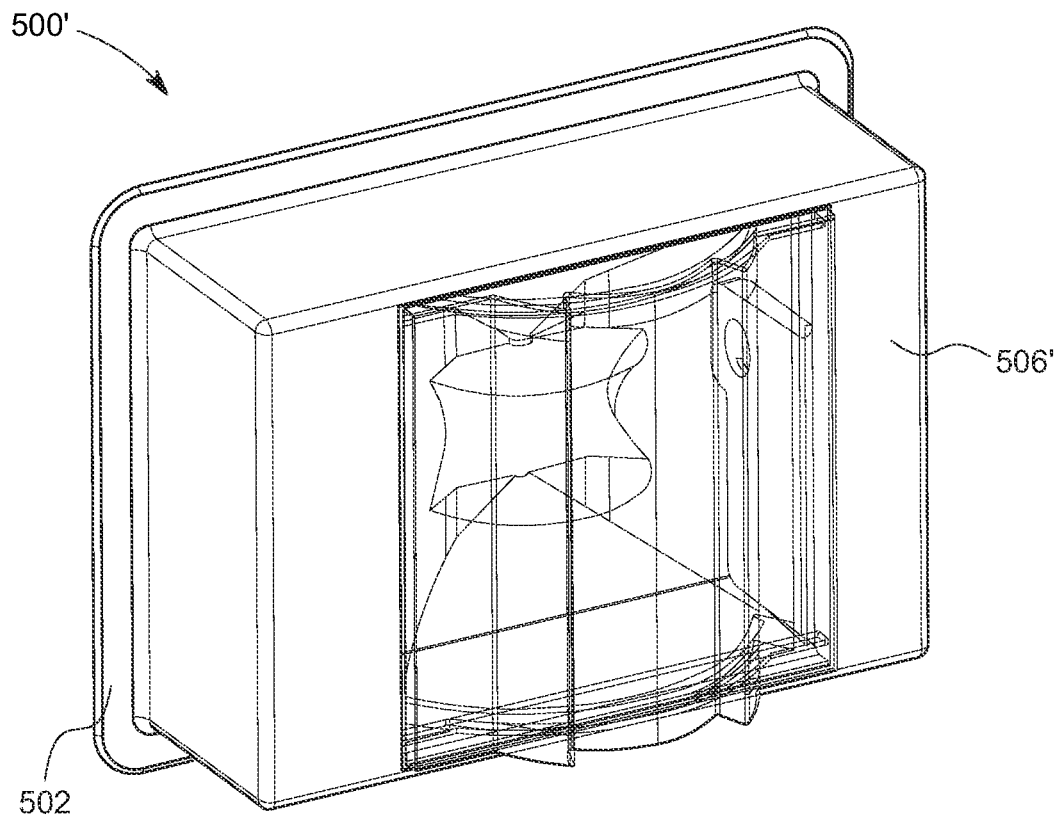
FIG. 5B is a front perspective view of a prescription lamp with single point adjustment as disclosed herein with an opaque skirt.
Figure 6A:
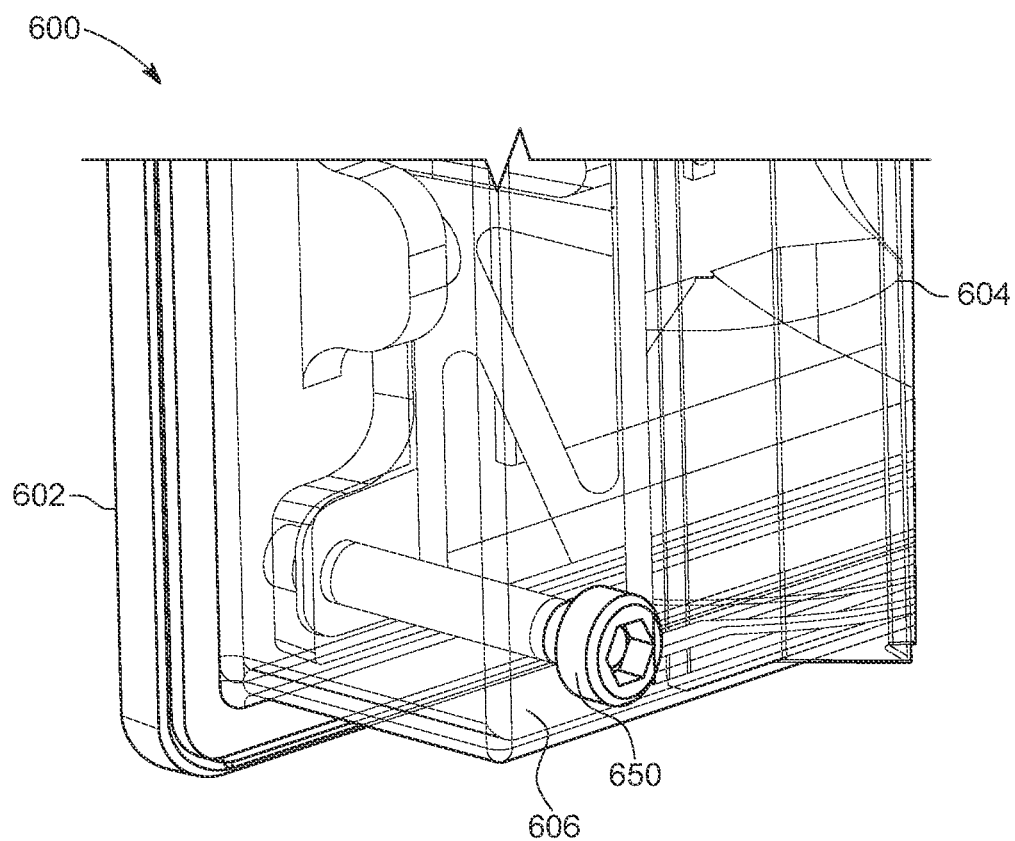
FIG. 6A is an enlarged portion of a prescription lamp illustrating a front-accessible adjustment mechanism.
Figure 6B:
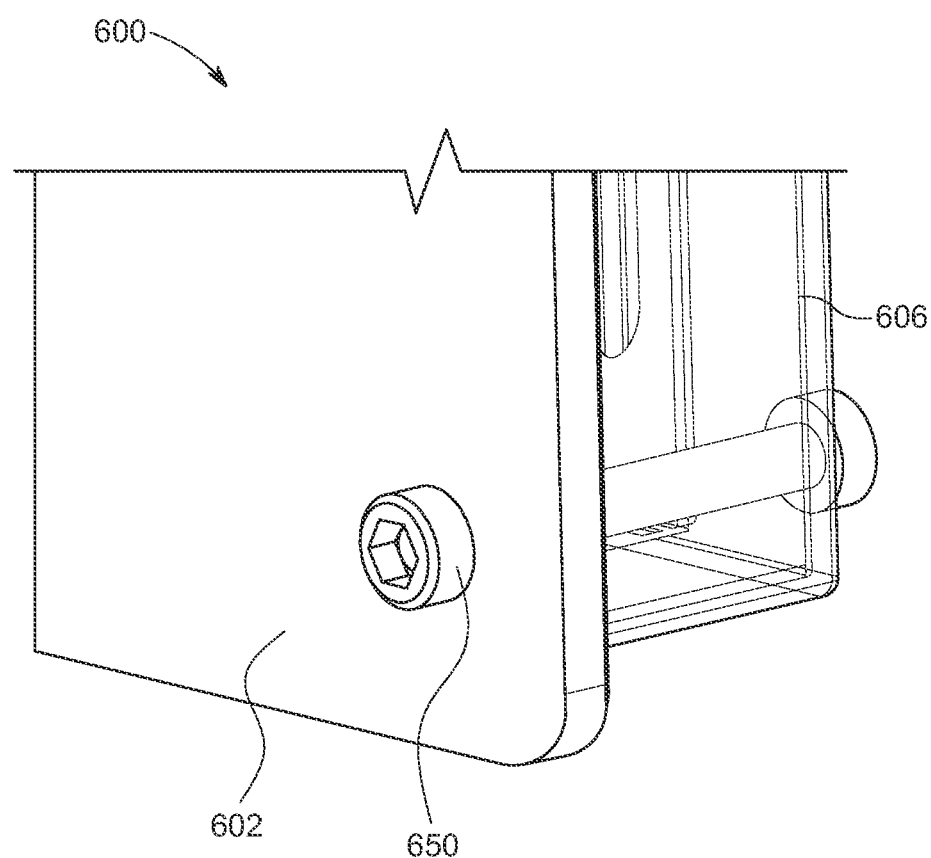
FIG. 6B is an enlarged portion of a rear perspective view of the prescription lamp in FIG. 6A showing the adjustment mechanism also accessible from the rear.

FIG. 5A is a perspective view of a prescription lamp 500 with a single-point adjustment mechanism 550. FIG. 5A is illustrated with a substrate 502 and a transparent skirt 506 in contact with the substrate 502. FIG. 5B is a perspective view of the prescription lamp 500' with an opaque skirt 506' mounted on the substrate 502. In FIGS. 5A and 5B, the single-point adjustment mechanism 550 is only accessible from a substrate side 502. FIGS. 6A and 6B are enlarged views of a prescription lamp 600 with a single-point adjustment mechanism 650 accessible from both the front side 604, through skirt 606, and the heat-sink side 602.

Figure 7:
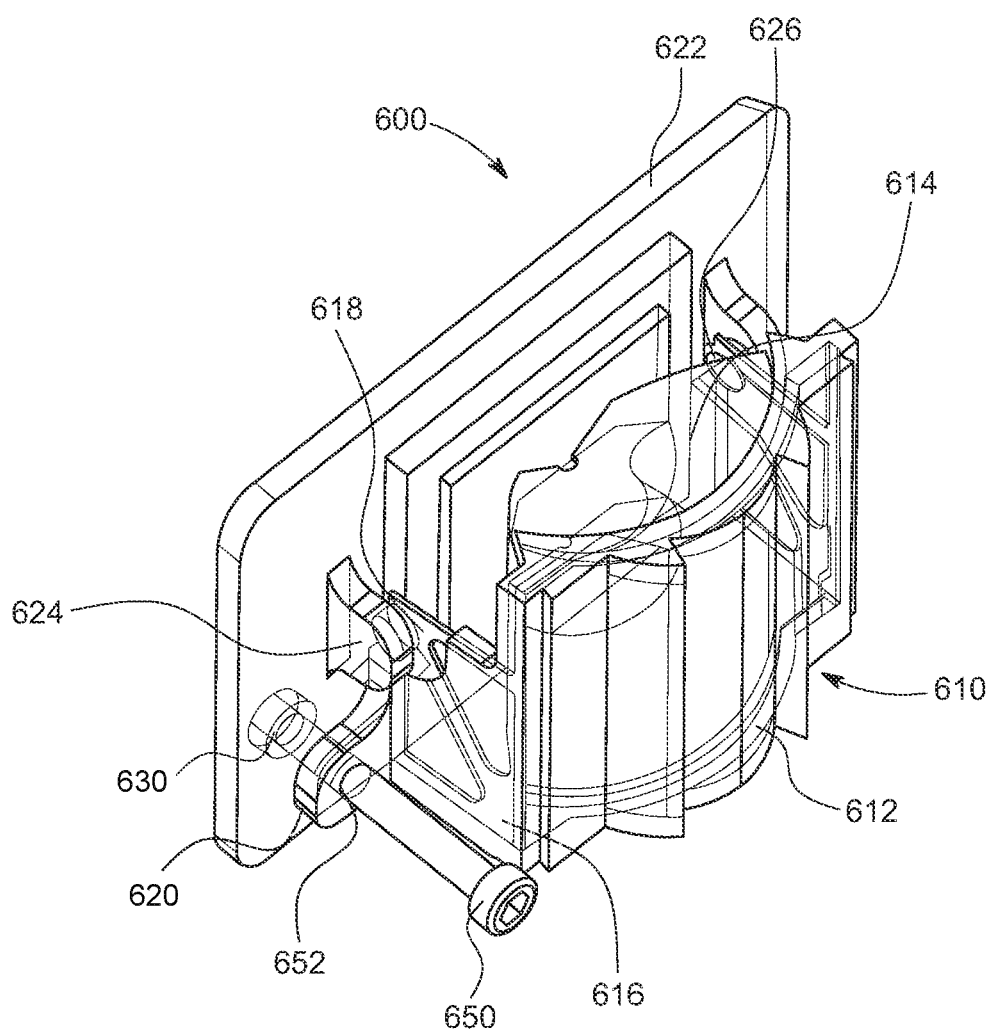
FIG. 7 is a front perspective view of a prescription lamp as disclosed herein with the skirt removed to better highlight the components.

FIGS. 7 and 8A-8C will be used to describe the single-point adjustment mechanism 650. FIG. 7 illustrates the prescription lamp 600 with the compliant skirt 606 removed. The prescription lamp 600 has a prescription optic 610 as disclosed herein. The prescription optic 610 is a unitary molded body molded from silicone comprising a front surface 612 configured as a light exit, an integral reflector 614 molded to meet a prescription light output, an integral attachment portion 616, and a reinforcing structure 618 molded with the unitary molded body, the reinforcing structure 618 imparting structural strength to the attachment portion 616. An LED light source is included (not shown), the integral reflector 614 receiving and reflecting light from the LED light source. The LED light source can be one or more of any kind of LED and can include one or more LED circuit boards. A substrate 622 carries the LED light source. The substrate 622 can be a supporting structure on which to mount the LED light source and prescription optic 610 or can additionally be a heat sink for the LED light source. A pivot mechanism 624 extends from the substrate 622 and has opposing pivots 626, wherein the reinforcing structure 618 is hingedly attached to the opposing pivots 626. The attachment portion 616 includes an alignment portion 620 integrally extending from the attachment portion 616 parallel to the substrate 622. The adjustment mechanism 650 extends through an aperture 652 in the alignment portion 610 of the reinforcing structure 618 at a position where the reinforcing structure 618 is covered with the compliant skirt 606. The compliant skirt 606 is a cover that fits around the front surface 612 of the optic 610 and is attached to the substrate 622 to cover and protect the attachment and alignment structures of the lamp 600. The front surface 612 is exposed to atmosphere as the silicone lens does not require any further lenses or covers to protect is from atmosphere as described earlier herein.

Figure 8A:
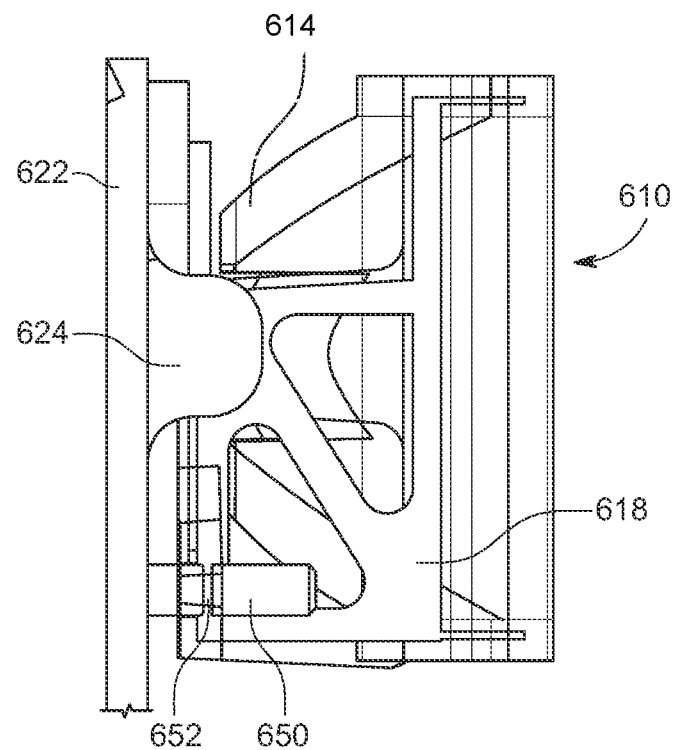
FIGS. 8A-8C are partial side views of FIG. 7 illustrating adjustment of the lens using the adjustment mechanism disclosed herein.
Figure 8B:
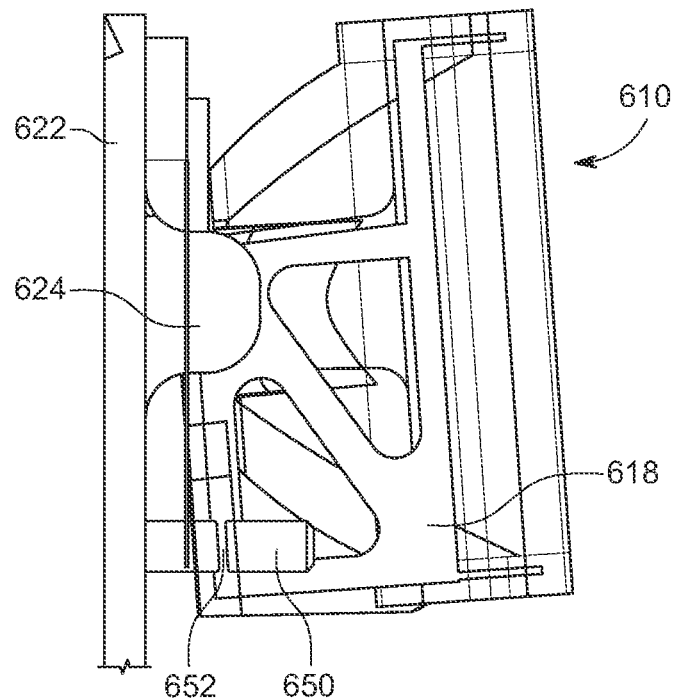
Figure 8C:
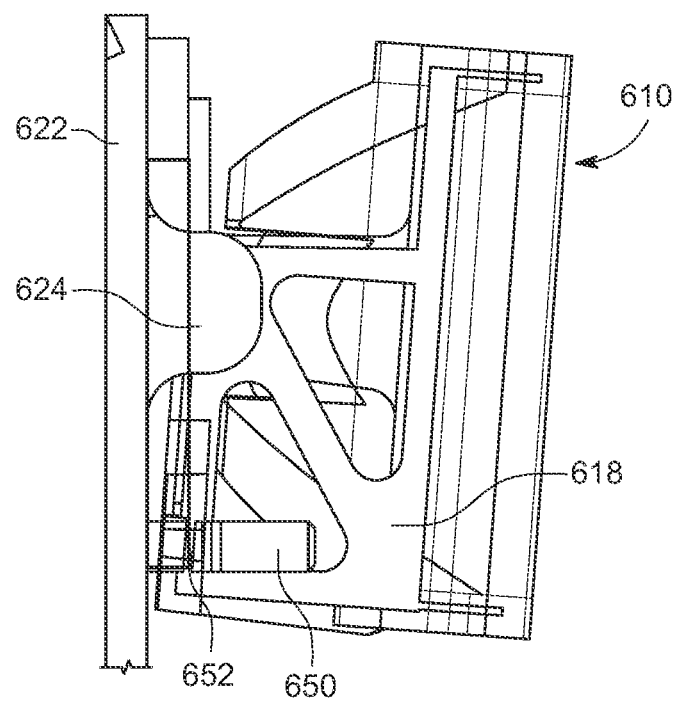

The single-point adjustment mechanism 650 can be a rotatable mechanism that is accessible from the front of the lamp 600, outside of the skirt 606, or from the rear of the lamp 600, outside of the substrate 622, or from both the front and the back of the lamp 600. As a non-limiting example, the adjustment mechanism 650 can be a screw that is threaded with the single point 652 of the reinforcing structure 618. To be accessible from both the front and back of the lamp 600, the screw would extend external to the skirt 606 as shown in FIG. 6A and through the substrate 622 as shown in FIG. 6B. The end of the adjustment mechanism 650 accessible from the substrate 622 can be flush with the substrate 622 as illustrated in FIGS. 8A-8C. The adjustment mechanism 650 can be threaded only at its interface with the aperture 652 in the reinforcing structure 618 to move the reinforcing structure 618, and thus the prescription optic 610, relative to the pivots 626. As a non-limiting alternative, the adjustment mechanism 650 may be fixedly attached to the reinforcing structure 618 at the aperture 652 via adhesive or flanges on either side of the reinforcing structure 618, and then threaded with the substrate 622 through substrate aperture 630. Any configuration is acceptable so long as the adjustment mechanism 650 is configured to move and fix the reinforcing structure 618, and thus the prescription optic 610, relative to the pivots 626.

FIG. 8A illustrates a neutral position of the prescription optic 610, with no degree of tilt with respect to the substrate 622. When the adjustment mechanism 650 is rotated one way, the reinforcing structure 618 moves in a first direction with respect to the pivots 626, thus moving the entire silicone optic 610 molded with the reinforcing structure 618 about the pivot mechanism 624, or the focal point, in the first direction, illustrated in FIG. 8B. Rotating the adjustment mechanism 650 the other way will conversely move the entire reinforcing structure 618 with the integral silicone prescription optic 610 about the pivot mechanism 654 in a second, opposite direction as illustrated in FIG. 8C. The movement needed for alignment of the lamp is small, commonly about 4 degrees in either direction.

Figure 9:
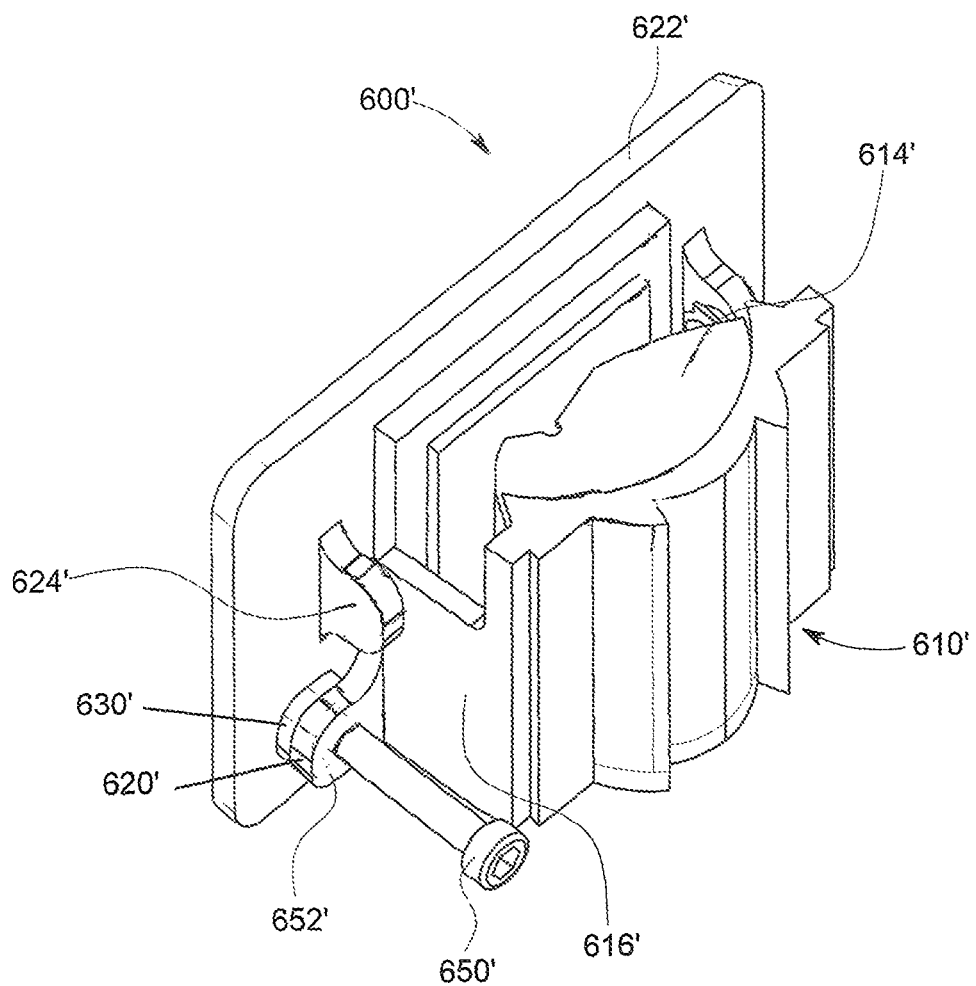
FIG. 9 is a front perspective view of another prescription lamp as disclosed herein with the skirt removed to better highlight the components.

The single-point adjustment mechanism 550, 650 works with the reinforced silicone optic because the silicone is flexible. The silicone will compress or extend as the reinforced structure is tightened or loosened against the heat sink via the adjustment mechanism, in turn moving the silicone optic about the focal point, or axis of the pivots because the reinforcing structure extends throughout the attachment portion of the unitary molded body and is attached to the opposing pivots. With a plastic lens or optic, there will be no flexibility for the adjustment mechanism to act upon, thereby precluding this type of adjustability. It is contemplated that a plastic, glass or other clear material lens could be used with the single-point adjustment mechanism if at least the point of adjustment, and at least between the lens and the substrate or heat sink, there is a covering or overmold of silicone, rubber or another flexible material. This would allow the plastic, glass or other suitable material lens to move about the pivot as the adjustment mechanism is rotated, either compressing the covering or allowing the covering to expand. As illustrated with the lamp 600' in FIG. 9, as no reinforcing structure is needed with the optic 610' of a suitable material other than silicone, the aperture 652' through which the alignment mechanism 650' extends is in an alignment portion 620' of attachment portion 616' of the non-silicone optic 610', both of which are also the suitable non-silicone material. The attachment portion 616' is also directly attached to the pivot mechanism 624'. To allow for the small degree of alignment necessary, the alignment portion 620' of the glass or plastic prescription optic 610' is covered in a flexible material 630', such as silicon or rubber, between the alignment portion 620' and the substrate 622'. Providing the flexible material 630' between the rigid glass, plastic or other suitable material alignment portion 620' and the substrate 622' allows for the small degree of movement necessary for the alignment of the prescription optic 610'.

Figure 10A:
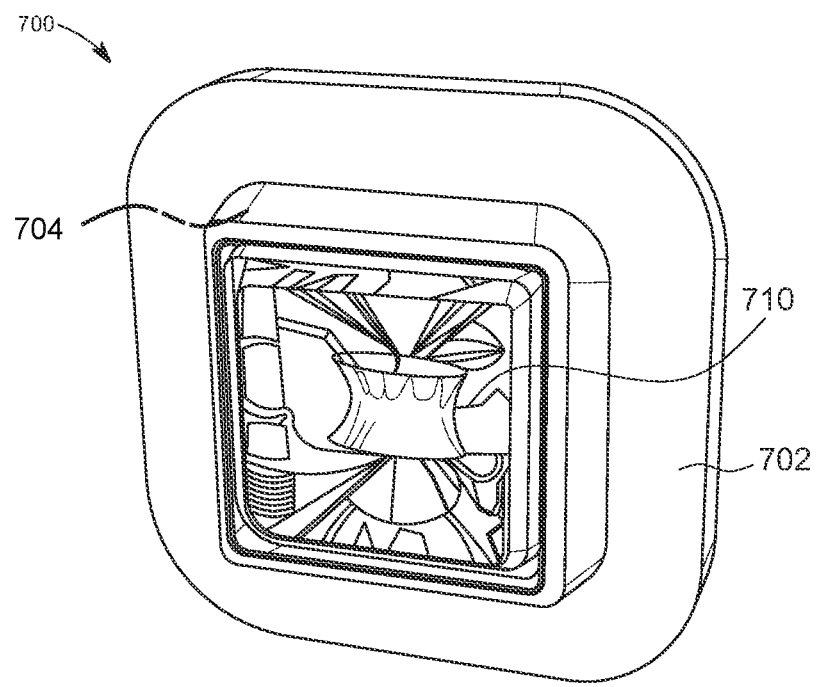
FIG. 10A is a front perspective view of a vehicle headlamp as disclosed herein.
Figure 10B:
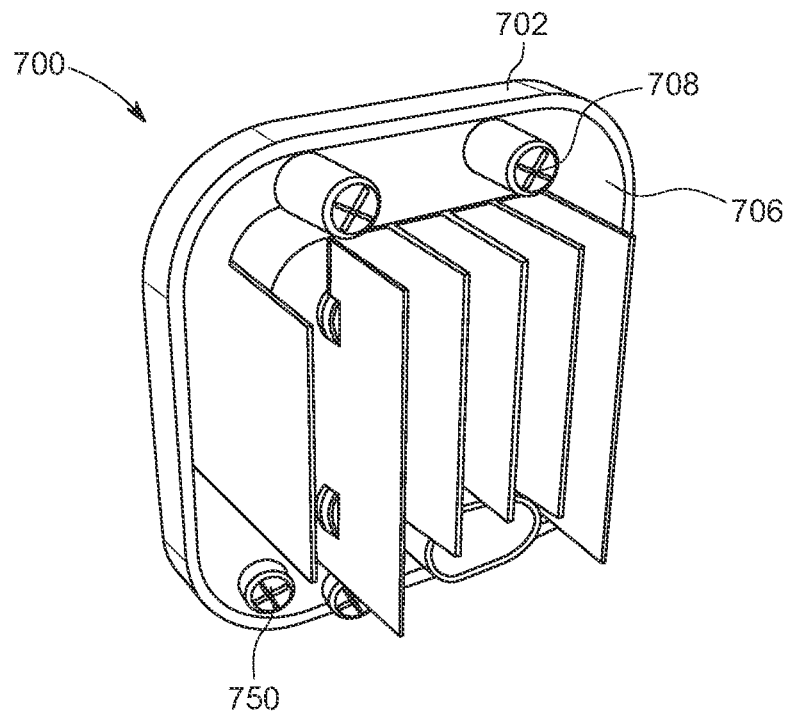
FIG. 10B is a rear perspective view of the vehicle headlamp in FIG. 10A.

FIGS. 10A and 10B illustrate a prescription lamp 700 with a housing 702. In FIG. 10A, the housing 702 conforms to the skirt 704 of the silicone optic 710. FIG. 10B illustrates the substrate 706 as a heat sink, this one with fins to expand the surface area to improve cooling. Four fasteners 708 are illustrated to attach the optic module to the housing 702. The single-point adjustment mechanism 750 is accessible from the heat sink side of the lamp. The housing 702 can be attached to the substrate 706 via any acceptable means such as adhesive, clips, etc.

Figure 11A:
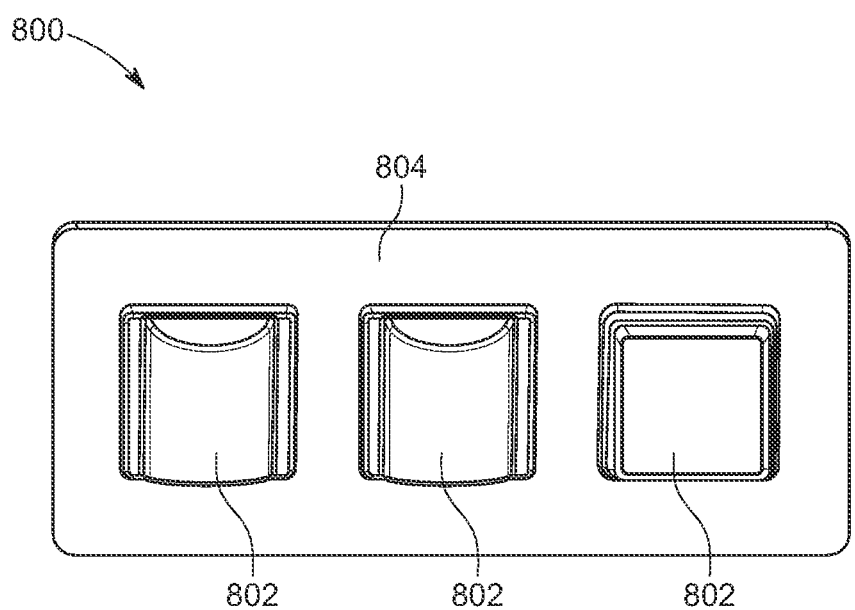
FIG. 11A is a front plan view of a multi-element vehicle headlamp and vehicle component as disclosed herein.
Figure 11B:
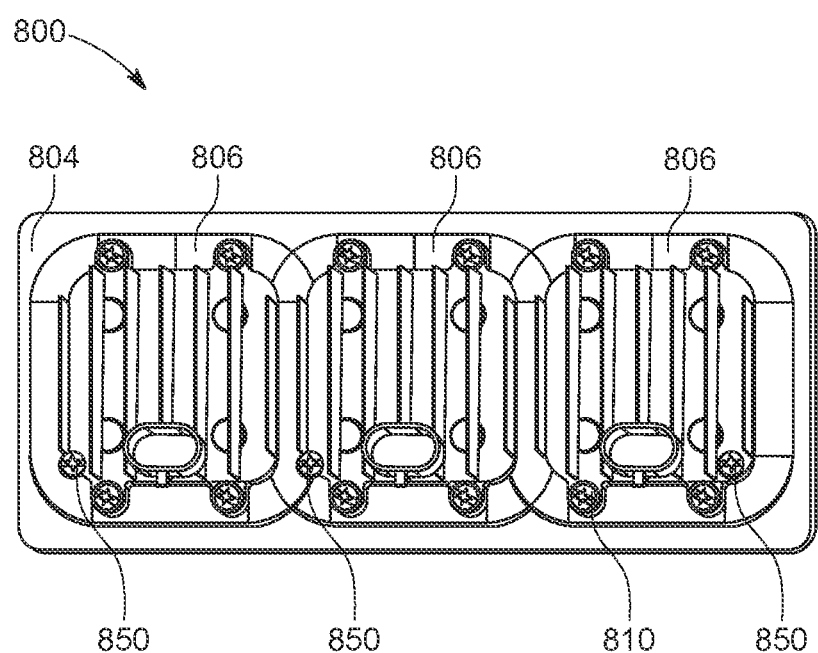
FIG. 11B is rear plan view of the multi-element vehicle headlamp and vehicle component of FIG. 11A.
Figure 12A:
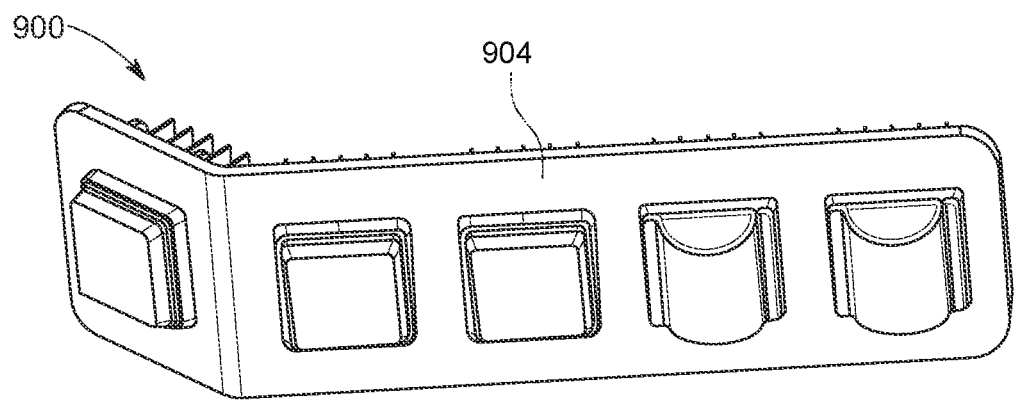
FIG. 12A is a front perspective view of a vehicle headlamp and vehicle component as disclosed herein.
Figure 12B:
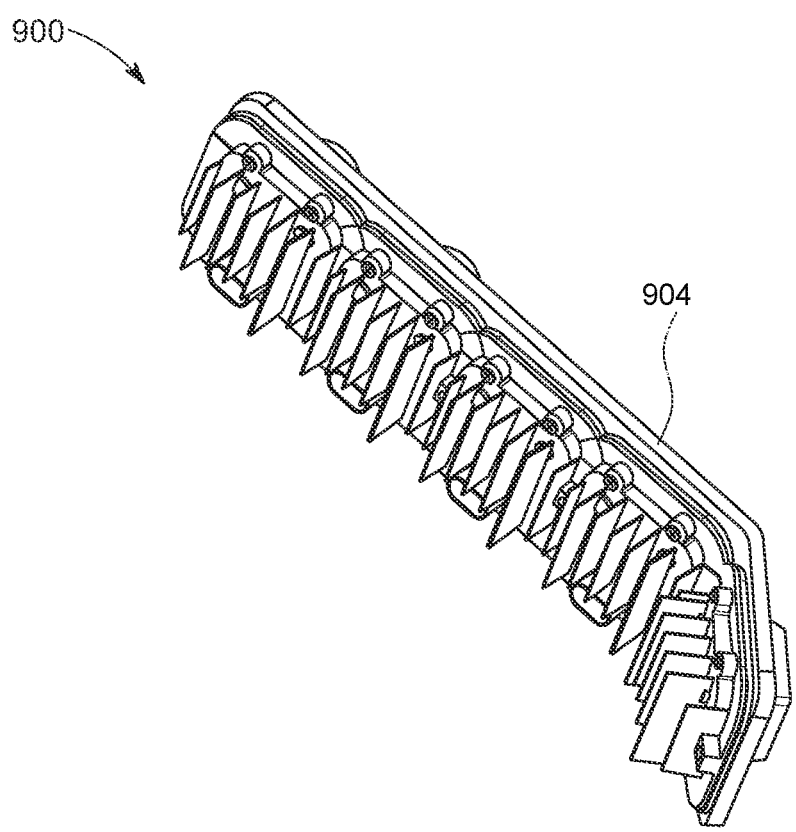
FIG. 12B is rear perspective view of the vehicle headlamp and vehicle component of FIG. 12A.

It is also noted that the single-point adjustment mechanism can be used with a structural headlamp as disclosed in U.S. Pat. No. 8,845,128 entitled "Structural Headlamp Assemblies for Vehicular Applications," incorporated herein by reference. The internally adjustable module shown in FIGS. 5-8 can be mounted through the structural element. The structural element becomes the lamp's housing. As illustrated in FIGS. 11A and 11B, a vehicle headlamp and component assembly 800 can include one or more lenses, with this example showing three lamps 802, a vehicle structural element 804 as the lamp housing cooperating with the lamp 802 to at least partially define a lamp chamber that is generally fluidly isolated from an ambient atmosphere outside the lamp chamber, at least one light source provided in the lamp chamber, a substrate 806, this one shown as a heat sink with fins to increase the surface area and improve cooling, the substrate 806 carrying the light source, with the lens pivotally attached to the substrate 806 as previously described. The vehicle structural element 804 is configured to bear structural loads applied by a vehicle component. A single-point adjustment mechanism 850 is positioned through an adjustment portion of the lens. The substrate 806, which carries the skirt, prescription optic, the light source and the adjustment mechanism, is attached to the vehicle structural element 804 via fasteners 810, as a non-limiting example. It is noted that each lamp 802 is adjusted individually with its respective adjustment mechanism 850. The lamp 802 can have an integral silicone prescription optic with a reinforced structure and a skirt as disclosed herein, or can be plastic, glass or other suitable material, so long as the lens is covered with silicone or rubber or the like between the alignment portion and the substrate at the point of adjustment, and the lens is attached via the pivot. FIGS. 12A and 12B are a vehicle headlamp and component assembly 900 as described with respect to FIGS. 11A and 11B except with five individual lamps and a non-linear formation configured to provide increased lateral illumination, such as the function of a cornering lamp or other similarly configured function. The vehicle headlamp and component assembly 900 also has a vehicle structural element 904.

Figure 13:
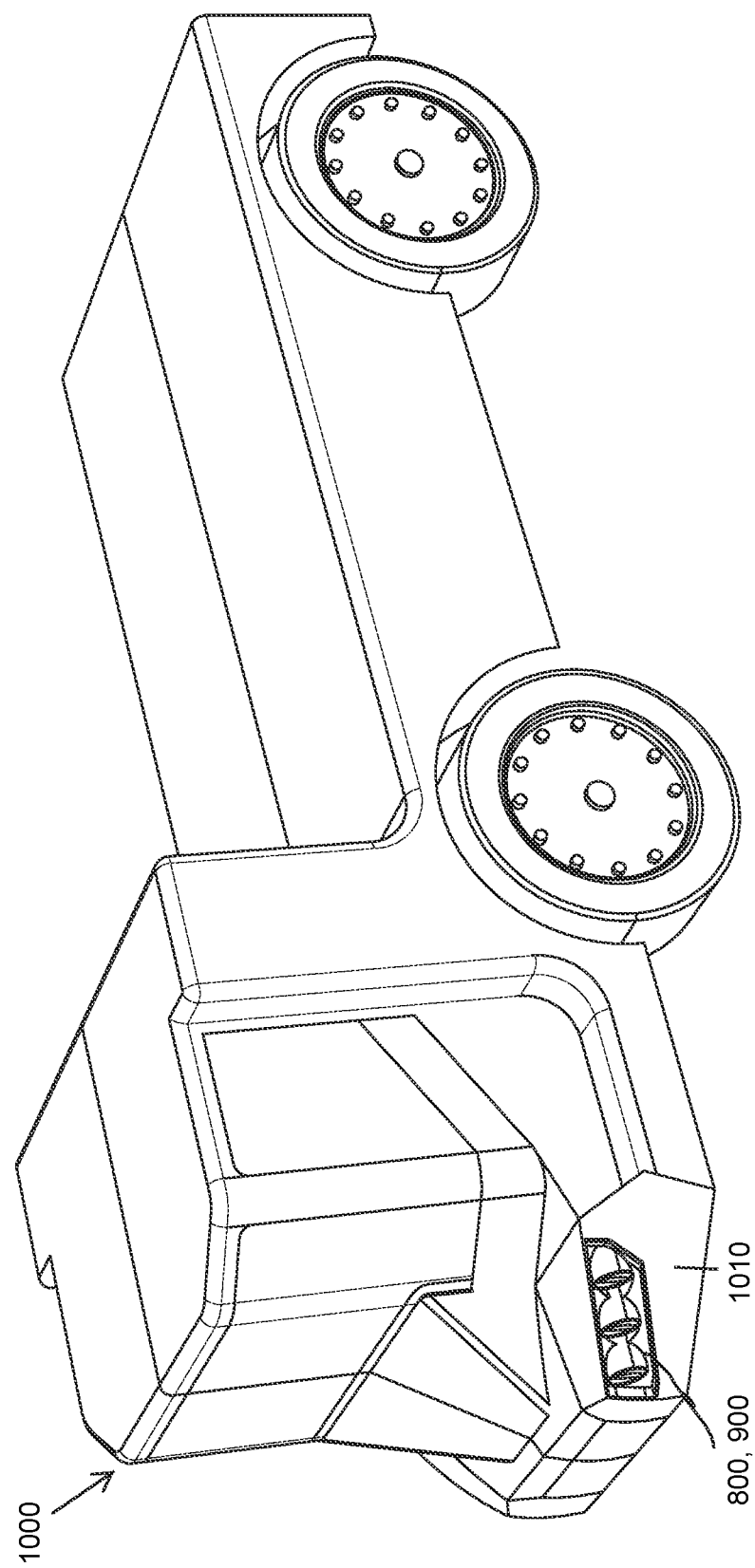
FIG. 13 is an illustration of a vehicle incorporating a multi-element vehicle headlamp as disclosed herein.

The vehicle structural element 804, 904 can be an exterior structure of a vehicle, such as an exterior panel, fender, bumper, reinforcement, a shield, etc. The vehicle structural element, as the lamp housing, is configured to support a load from a vehicle component which can be, as non-limiting examples, an inner fender support, a radiator support/module, a vehicle structural member, a battery box, an electronic control module, a snow-plow support structure, and a reinforcing structure. FIG. 13 is an illustrative example of a vehicle headlamp and component assembly 800, 900 as described with respect to FIGS. 11A and 11B and 12A and 12B wherein the vehicle structural element 804, 904 is a front fender or bumper 1010 of the vehicle 1000.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A vehicle lamp, comprising:
a substrate having a surface on which at least one light source is carried, the at least one light source configured to emit light away from the surface, the substrate having a first aperture;
a lens having a pivotal attachment to the surface of the substrate and defining a lamp chamber between the lens and the surface of the substrate;
an alignment portion integral with and extending from the lens parallel to the surface of the substrate, the alignment portion having a second aperture that aligns with the first aperture; and
an adjustment mechanism extending through the first aperture and the second apertures, the adjustment mechanism fixedly attached to the alignment portion and configured to adjust alignment of the lens with a single-point adjustment, wherein the adjustment mechanism has a threaded section and the first aperture in the substrate has counterpart threads, wherein rotation of the adjustment mechanism moves the lens about the pivotal attachment.

2. The vehicle lamp according to claim 1, wherein the lens is formed of silicone, the lens having a reinforcement structure extending at least to the alignment portion and the pivotal attachment and covered in the silicone, the second aperture extending through the reinforcement structure.

3. The vehicle lamp according to claim 1, wherein the lens is a material other than silicone and the alignment portion includes a flexible material between the alignment portion and the substrate, the second aperture extending through the flexible material.

4. The vehicle lamp according to claim 1, wherein the substrate is a heat sink exposed to ambient atmosphere outside the lamp chamber such that heat from the at least one light source is transmitted to the ambient atmosphere.

5. The vehicle lamp according to claim 1, further comprising a compliant skirt that frames a front surface of the lens where light exits and extends to the substrate, enclosing the lamp chamber.

6. The vehicle lamp according to claim 5, wherein the compliant skirt is one of a transparent material or an opaque material.

7. The vehicle lamp according to claim 1, further comprising a housing, the housing being a vehicle structural element configured to bear a load from a vehicle component.

8. The vehicle lamp according to claim 7, wherein the vehicle structural element is an exterior panel, a fender, a bumper, or other vehicle exterior component.

9. The vehicle lamp according to claim 7, wherein the vehicle component is one of a fender support, a radiator support/module, a vehicle structural member, a battery box, an electronic control module, and a reinforcing structure.

10. A prescription lamp, comprising:
a unitary molded lens of optical silicone, comprising:
a front surface configured as a light exit;
an integral reflector configured with the front surface to meet a prescription light output;
an integral attachment portion located midway along a height of the unitary molded lens; and
a reinforcing structure of a material other than the optical silicone molded within the unitary molded lens, the reinforcing structure imparting structural strength to at least the attachment portion;
a substrate on which an LED light source is carried;
a pivot mechanism extending directly from the substrate, wherein the attachment portion is hingedly attached to the pivot mechanism; and
an adjustment mechanism extending at a single point through the attachment portion and the substrate in a direction perpendicular to the front surface of the unitary molded lens.

11. The prescription lamp of claim 10, wherein the prescription lamp is an exterior vehicle lamp.

12. The prescription lamp of claim 10, wherein the adjustment mechanism is threaded with the reinforcing structure, the adjustment mechanism moving the unitary molded lens about the pivot mechanism when rotated.

13. The prescription lamp of claim 10, further comprising a skirt framing the front surface and covering the adjustment mechanism and pivot mechanism, leaving the front surface exposed to atmosphere.

14. The prescription lamp of claim 13, wherein the adjustment mechanism is further accessible from a face of the skirt.

15. The prescription lamp of claim 10, wherein the substrate is a heat sink.

16. The prescription lamp of claim 10, wherein the adjustment mechanism is located below and spaced from the pivot mechanism along the height of the unitary molded lens.

17. A vehicle lamp, comprising:
a substrate having a surface on which at least one light source is carried, the at least one light source configured to emit light away from the surface, the substrate having a first aperture;
a lens having a pivotal attachment to the surface of the substrate and defining a lamp chamber between the lens and the surface of the substrate;
an alignment portion integral with and extending from the lens, the alignment portion having a second aperture that aligns with the first aperture; and
an adjustment mechanism extending through the first aperture and the second aperture, the adjustment mechanism fixedly attached to the substrate and configured to adjust alignment of the lens with a single-point adjustment, wherein the adjustment mechanism has a threaded section and the second aperture in the alignment portion has counterpart threads, wherein rotation of the adjustment mechanism moves the lens about the pivotal attachment.

* * * * *